(No Model.)
A. CAMPBELL.
BUILDING BLOCK OR TILE.
No. 248,288. Patented Oct. 18, 1881.
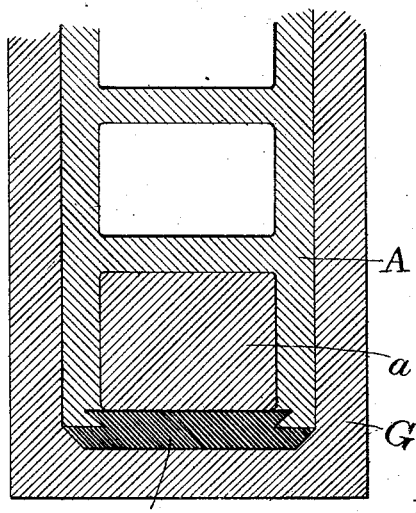
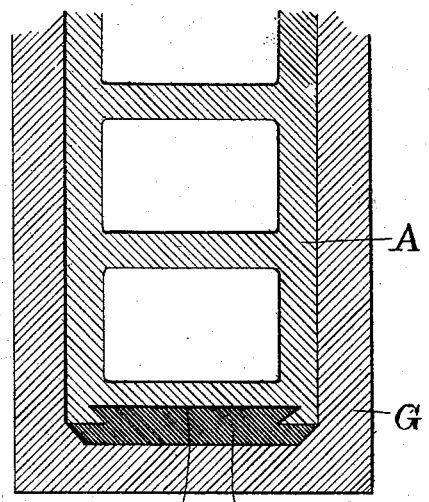
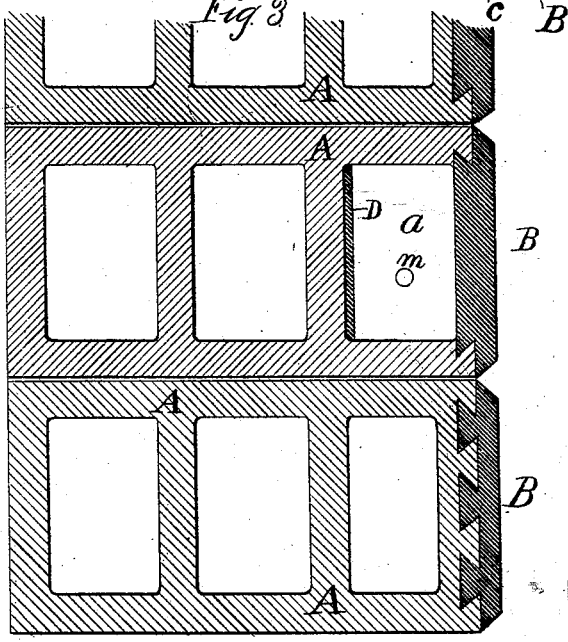
WITNESSES
Katie R. Acker.
Charles R. Searle.
INVENTOR
Augustine Campbell
by his attorney
Thomas L. Stetson

UNITED STATES PATENT OFFICE.

AUGUSTINE CAMPBELL, OF METUCHEN, NEW JERSEY.

BUILDING BLOCK OR TILE.

SPECIFICATION forming part of Letters Patent No. 248,288, dated October 18, 1881.

Application filed March 15, 1881. (No model.)

*To all whom it may concern:*

Be it known that I, AUGUSTINE CAMPBELL, a citizen of the United States, residing at Metuchen, Middlesex county, in the State of New Jersey, have invented certain new and useful Improvements Relating to Building Blocks or Tiles, of which the following is a specification.

I make a hollow tile chiefly of baked clay, but with a front of cheap glass strongly united to the clay. The front of my tile, which is exposed to the weather, is non-absorbent of moisture, does not require paint or other preservative, and produces a rich and decorative effect. It, furthermore, may allow the production of remarkable effects by illumination when required.

The accompanying drawings form a part of this specification.

Figure 1 is a cross-section through one of my blocks and through the mold in which it is formed. Fig. 2 is a corresponding section of a modification. Fig. 3 is a section through my blocks in place in the front of a building.

Similar letters of reference indicate corresponding parts in all the figures.

The main body A of my tile is of strong, burning clay, properly wrought to produce a hollow block of the required dimensions. I employ a die of proper form, and produce the clay portion of the blocks by pressing the properly-tempered clay through the die, and making thereby a block of a length a little in excess of that required. The excess of length is afterward cut off, and the end, being squarely finished, the whole is baked or burned in a kiln. So far as yet described, my tile and the mode of manufacturing it may be identical with that described in the manufacturing the main part in the patent to me, dated March 9, 1880, No. 225,338.

To produce the required thick front B, I take melted glass, which may be of the inferior quality produced in immense quantities in the manufacture of pig-iron, and known in the iron manufacture as "cinder." This material, either with the original heat at which it comes from the blast-furnace or subsequently heated to a melted condition, is flowed into a mold, G, containing the clay portion of one of my tiles, and allowed to harden in contact therewith. The juncture c is strong and reliable.

The entire clay portion, or that side thereof which has to come in contact with the glass, should be previously heated to a temperature nearly or quite equal to that of the glass. After the melted glass is applied it is held for a few minutes in the mold, which may be cast-iron with a smoothly-finished interior, and previously raised to a temperature approximating that of the glass. When the parts have slowly cooled until the glass is sufficiently hard, the completed tile is removed from the mold and placed in an annealing-kiln, where it cools with the proper slowness until it is reduced to about 200° Fahrenheit. It may then be removed and allowed to complete its cooling in the open air.

I have shown two forms of the tile. In that shown in Fig. 1 a portion of the mold extends through, just within the space for the glass, as indicated by *a*. In the form shown in Fig. 2 there is no space to be produced by the mold behind the glass. The glass in this latter form applies against a larger surface of the ceramic material.

To manufacture the two forms it is only necessary that the molds should be correspondingly modified. In both cases the melted glass is introduced in the mold after the other portion or portions are in place, and in both cases the glass adheres strongly to the clay and remains permanently united thereto after the annealing, while it separates easily from the smooth iron.

The form shown in Fig. 2 has the advantage that the vitreous and the ceramic material apply together over a large surface.

The form shown in Fig. 1 has the advantage that when the block is in use in a building, or, preferably, when a long series of such blocks form a line quite across the front, or form any desired letters on the front of a large building, they may be lighted by gas-burners or electric lights introduced in the space behind the glass, and thus may contribute an important addition to the architectural effect, or, rather, to the general effect of the façade. This may be of marked effect in deeply-shaded situations and in all situations at night.

Fig. 3 indicates the general situation of one of my blocks in a building-front with an electric light, *m*, in the space behind the glass.

Another mode of employing the form shown in Fig. 3 is to silver the back of the glass. This, by increasing the reflective power, may give a strong effect to lettering introduced in the front in the day-time.

My invention in its fully-completed form involves both effects. I employ a separate plate of glass, D, having a silvered back, placed in rear of the space behind the glass. In daylight the light penetrating the front glass, B, and entering the space in the rear is reflected forward again from the glass D, and thus the front made more brilliant. In the night the electric or other light $m$ shines out through the front glass, B, with its full, proper effect, and is also re-enforced by a considerable quantity of light which was originally projected backward from the lamp $m$, but was caught by the mirror D and thrown forward again.

Modifications may be made in the forms and proportions of the details. I make the tiles with a greater or less number of separate cavities, or with a greater or less height relatively to the breadth. The thickness of the glass B may be increased or diminished. I can use a good quality of glass, and in some classes of work it may be expedient to employ such; but for ordinary work I propose to employ the inferior quality from the iron-furnaces, as stated.

I propose for some purposes, eminently for making the walls of banks and analogous buildings containing valuables, and also for making masonry-subdivisions thereof to serve as safes or as strong-rooms to contain safes, to introduce in the melted portion B a material which shall aid to resist drilling. I believe that this can be done by putting various foreign substances into the glass, and thus giving it either an entirely hard character or inequalities in hardness which makes it destructive to drills.

Instead of glass I can substitute for these purposes other fusible material. I propose to use melted metal, and especially cast-iron made under certain conditions from ores containing zinc and known as "franklinite." Its great hardness eminently makes it nearly drill-proof.

The material B, when employed for burglar-proof purposes, may be applied in the same manner as above described.

In order to increase the locking of the vitreous to the ceramic material, I can in the form shown in Fig. 2 have a number of locking projections and recesses distributed over the surfaces where the two materials come together. The lower block in Fig. 3 shows such provision.

The front face of the whole made with either kind of construction may be finished with treatment by a sand-blast or otherwise, so as to give an opal effect.

I claim as my invention—

1. The compound tile described, having a ceramic body and a vitreous front applied and annealed together, substantially as herein specified.

2. A compound tile of ceramic and vitreous material, having a space, $a$, directly in rear of the glass, and adapted to serve as herein specified.

3. In combination with a tile or building-block composed partly of ceramic and partly of vitreous material, a mirror, D, introduced in rear of the front glass, B, and adapted to serve as herein specified.

4. In combination with a compound tile of vitreous and ceramic material, the light or series of lights $m$, arranged to serve as herein specified.

5. The light $m$, mirror D, front glass, B, and ceramic block or body A, combined and arranged to serve in a building, substantially as herein specified.

In testimony whereof I have hereunto set my hand, at New York city, N. Y., this 12th day of March, 1881, in the presence of two subscribing witnesses.

AUGUSTINE CAMPBELL.

Witnesses:
W. COLBORNE BROOKES,
CHARLES C. STETSON.